US010535228B2

(12) United States Patent
Mariscal et al.

(10) Patent No.: US 10,535,228 B2
(45) Date of Patent: Jan. 14, 2020

(54) GAMING MACHINE AND METHOD HAVING IMPROVED PERSISTENT GAME MODE FEATURE

(71) Applicant: Everi Games, Inc., Austin, TX (US)

(72) Inventors: Juan Mariscal, Chicago, IL (US); Michael Khoury, Chicago, IL (US); Cydny Audia, Chicago, IL (US)

(73) Assignee: Everi Games, Inc., Austin, TX (US)

( * ) Notice: Subject to any disclaimer, the term of this patent is extended or adjusted under 35 U.S.C. 154(b) by 440 days.

(21) Appl. No.: 15/275,017

(22) Filed: Sep. 23, 2016

(65) Prior Publication Data

US 2018/0089947 A1 Mar. 29, 2018

(51) Int. Cl.

| | |
|---|---|
| ***A63F 9/24*** | (2006.01) |
| ***A63F 13/00*** | (2014.01) |
| ***G06F 17/00*** | (2019.01) |
| ***G06F 19/00*** | (2018.01) |
| ***G07F 17/32*** | (2006.01) |
| ***G07F 17/34*** | (2006.01) |

(52) U.S. Cl.

CPC ...... *G07F 17/3262* (2013.01); *G07F 17/3209* (2013.01); *G07F 17/3213* (2013.01); *G07F 17/3258* (2013.01); *G07F 17/34* (2013.01)

(58) Field of Classification Search

CPC .......................... G07F 17/326; G07F 17/3267

See application file for complete search history.

(56) References Cited

U.S. PATENT DOCUMENTS

2002/0022509 A1* 2/2002 Nicastro, II ............ G07F 17/32 463/15
2002/0037764 A1* 3/2002 Anderson ............... G07F 17/32 463/16
2002/0090987 A1* 7/2002 Walker .................... G07F 17/32 463/16
2002/0142846 A1* 10/2002 Paulsen .............. G06Q 30/0209 463/43
2013/0225268 A1* 8/2013 Caputo ................. G07F 17/323 463/25

* cited by examiner

*Primary Examiner* — Milap Shah
*Assistant Examiner* — Jason Pinheiro
(74) *Attorney, Agent, or Firm* — Nathan H. Calvert; The Culbertson Group, P.C.

(57) ABSTRACT

A gaming system, apparatus, and method are disclosed providing improvements to feature games played on slot machines or other gaming machines. A bonus symbol feature game selection is provided that determines multiple feature games to be made available for the player by a player selection. The games made available are determined at least in part based on the base game result. A wheel enhancement feature game is provided in which a wheel is modified with various types of persistent modifications selected by player picks. The enhancements accumulate until a wheel spin is achieved, building excitement with the player. Chances of achieving a wheel spin may also be altered by the persistent modifications.

6 Claims, 11 Drawing Sheets

GAMING MACHINE AND METHOD HAVING IMPROVED PERSISTENT GAME MODE FEATURE

FIELD OF THE INVENTION

This invention relates to gaming systems and to gaming machines through which players may participate in wagering games, and in particular slot machine games with a feature game that provides accumulating persistent events.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all rights of copyright whatsoever.

BACKGROUND

Many different types of gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Many video-based gaming machines have three or five spinning reels that may be stopped to display a matrix of game symbols. The symbols displayed on the stopped reels correlate to a result of the game. Video-based gaming machines may also be used to show card games or various types of competitions such as simulated horse races in which wagers may be placed.

Game manufacturers are continuously pressed to develop new game presentations, formats, and game graphics in an attempt to provide high entertainment value for players and thereby attract and keep players. One such improvement is the use of persistent features that affect game results across multiple rounds of a base or feature game. What is needed are ways to provide both anticipation and excitement to players in activing such feature games and playing with persistent features.

SUMMARY OF THE INVENTION

The present invention includes wagering games, gaming machines, networked gaming systems that provide improvements to feature games played on slot machines or other gaming machines. A bonus symbol feature game selection is provided that determines multiple feature games to be made available for the player by a player selection. The games made available are determined at least in part based on the base game result. A wheel enhancement feature game is provided in which a wheel is modified with various types of persistent modifications selected by player picks. The enhancements accumulate until a wheel spin is achieved, building excitement with the player. Chances of achieving a wheel spin may also be altered by the persistent modifications.

According to one aspect of the invention, a method of providing wagering game with selectable bonus feature is provided that conducts a base game and provides a feature game outcome by determining a set of selectable feature games from a larger pool of feature games, the selection based at least partially on symbols present in the base game result matrix of symbol locations. After determining the set of selectable feature games, the method displays an animation on at least one of the gaming displays with graphic indicators to the player selectable feature games. Then it provides a player selection option in which the set of selectable feature games are available to be selected. It receives a player selection at the player selection option and based on the player selection, displaying an indication of the selected feature game and indications of the locations of non-selected feature games in the player selection option. It then conducts the selected feature game including a chance to win money value credits. The options for selection of the feature game are preferably shown to the player and then concealed when the player makes their selection.

According another aspect of the invention, a method of providing a wagering game is given, the method conducted under control of one or more electronic processors to present gaming results on one or more displays on a gaming machine. The method includes receiving a wager activation from a player on a player input device at the gaming machine. In response, it conducts a base game round ending with a base game result including a possibility of winning money value credits and a possibility of including a trigger event or feature game selection event. When the trigger event or feature game election event, it conducting a feature game including displaying a wheel having multiple symbol locations or segments, and displaying a group of hidden player selectable items that, when selected, have at least one of the following effects all available in the feature game: i) activating a spin of the wheel, causing the wheel to rotate for a period of time and stop at a particular angular orientation which is evaluated for a winning outcome based on the location of the wheel's symbol locations, and awarding a resulting prize to the player; ii) modifying one or more of the wheel's multiple symbol locations in a persistent manner to improve the player's options available for winning; iii) modifying the wheel in a persistent manner to improve the player's probability of winning a high value prize; and iv) modifying the number of chances available in the feature game to win a spin the wheel. The method provides the player a number of selections from the hidden selectable items, and conducts the designated effect of each selected item on wheel. It causes any resulting awards including money value credits won to be transferred to a player credit account redeemable for money value.

Another aspect of the invention is a computer program stored on a non-transitory readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels each including one or more symbol locations. The program also has game controller program code for determining game play results involving spins or other randomization of an array of symbols, and providing the feature game selection method or the wheel enhancement feature game mode and its animations.

Another aspect of the invention is a gaming system that includes one or more gaming servers, and a group of electronic gaming machines connected to the servers by a network, programmed to provide one of more of the methods described herein. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game results to present the results received from the server in an entertaining manner. However, other embodiments of course might use a thin client architecture in which the animation is also conducted by the server and electronic gaming machines serve merely as a terminal to receive button or touchscreen input from the player and to display graphics received from the server.

Different features may be included in different versions of the invention. These and other advantages and features of the invention will be apparent from the following description of the preferred embodiments, considered along with the accompanying drawings.

DETAILED DESCRIPTION OF PREFERRED EMBODIMENTS

Figure 1A:
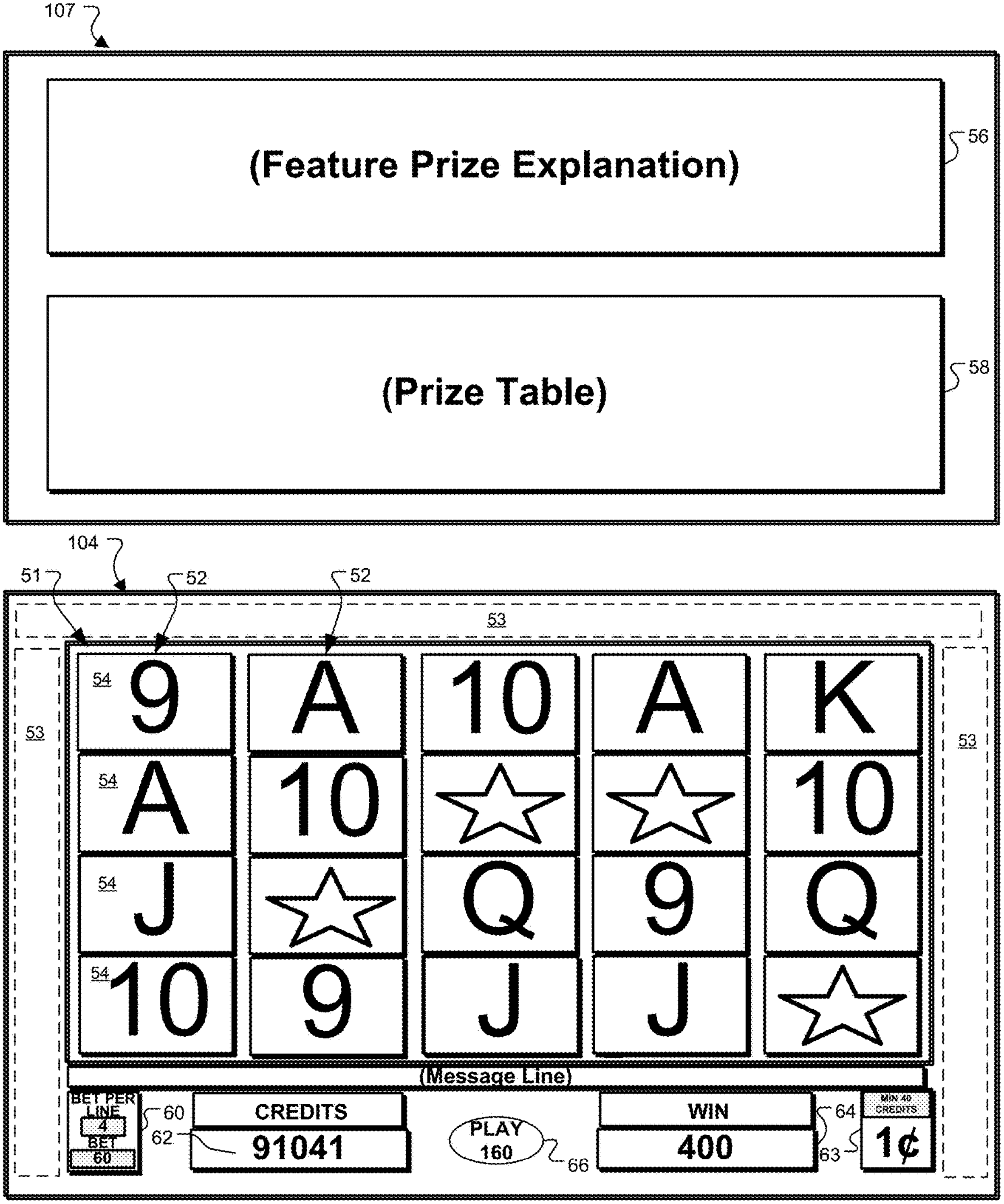
FIG. 1A is a diagram of an example base game screen show reel game with a feature game select option.

FIG. 1A is a game screen diagram illustrating a base game mode showing the primary display 104 and secondary (top) display 107 to illustrate an example slot machine display arrangement on which wagering game results are presented in a gaming area, typically found on the primary display. On the secondary display 107 in box 56 are the instructions for playing the game. Underneath the instructions, a prize table is shown in box 58, are the prizes that can be won as well as the requirements for winning Background, side, and top graphics 53 may be animated during or between games as part of the multimedia theme of the game as further discussed below.

The gaming area of a reel-type primary game (as opposed to bonus games or other feature games as described herein) in this version is a matrix 51 of symbol locations arranged in rows and columns to represent simulated slot machine reels that are spun to conduct a game round. Other embodiments may, of course, use other types of game displays to display randomizing of symbols according to the methods herein. The depicted columns of symbols labeled 52 represent the simulated reels, while symbols are shown in each symbol location designated 54. In this instance there are five reels with four symbol locations 54 displayed at a time on each reel, but the game can be played with more and less reels. The simulated reel typically has far more symbols than those displayed, and as many unique stop positions as there are symbols on the simulated reel. The stop position may be counted, for example, by numbering the symbols on the simulated reel and using the number of the symbol at the bottom of the display window (the three symbols displayed in this example), or at the top or middle. Further, while multi-symbol reels are shown, other versions may use simulated uni-symbol reels, or a reel that has many symbols thereon but only a single window to the reel simulated, displaying a single symbol from the reel. Some variations of the present invention may use a simulated uni-symbol reel in each depicted symbol location 54. Surrounding the matrix 51 is background graphics 53, which may be above, beside, below, between or behind the symbol locations 54 of matrix 51.

Winning patterns are typically formed by matching symbols along defined paylines that pass through the matrix 51. Box 60, which displays the current wager and amount bet per payline. Other versions may not have a designated bet per line. To the right of box 60 is box 62, which displays the current credits in the player's account. In the bottom center a touchscreen play button 66 is presented in the lower central area of the display, which may show other game state related graphics. Right of this is win box 64, which displays the player's last awarded winnings. The wager credit denomination is shown in box 63. Along the bottom edge of the matrix 51 there is a message line, where the game station can display further instructions to the player.

FIGS. 1B-1G are a series of screen views for an example game sequence in which a feature game outcome is achieved on a base game, and a player selects from items that determine what feature game will be played. This feature game select sequence will be further described below with respect to the flowchart of FIG. 2A.

Figure 1B:
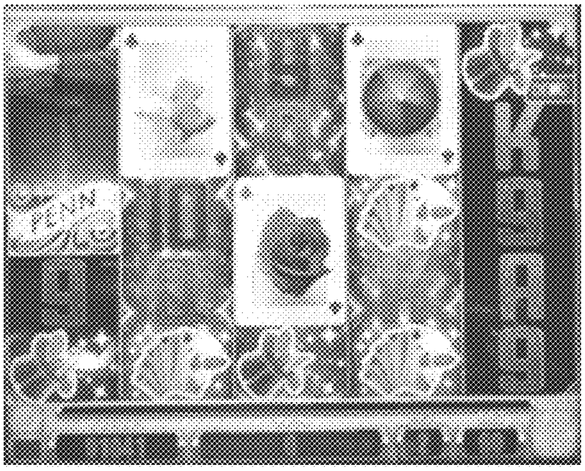
FIGS. 1B-1G are a series of screen views of a game like that of FIG. 1A, showing an example game sequence in which a feature game outcome is achieved on a base game, and a player selects from items that determine what feature game will be played.
Figure 1C:
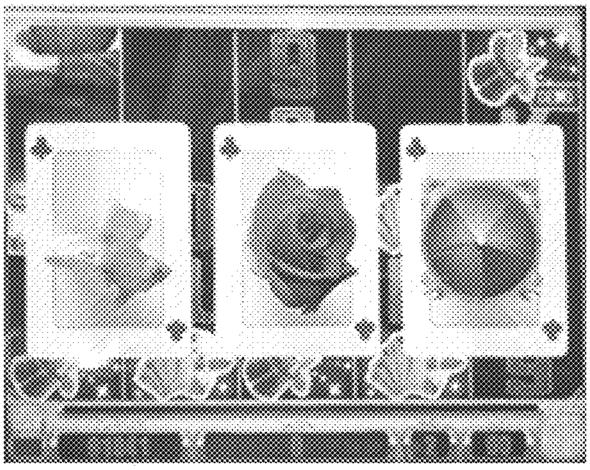
Figure 1D:
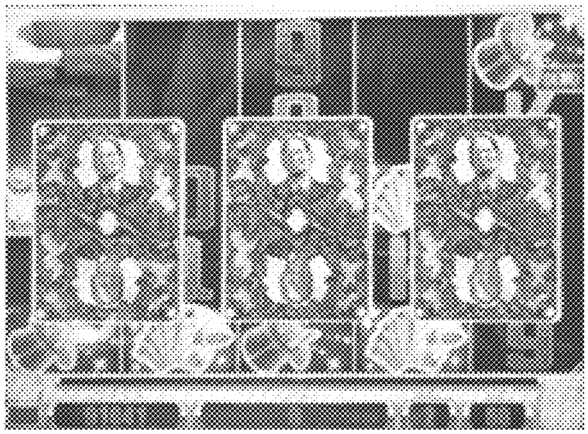
Figure 1E:
Figure 1F:
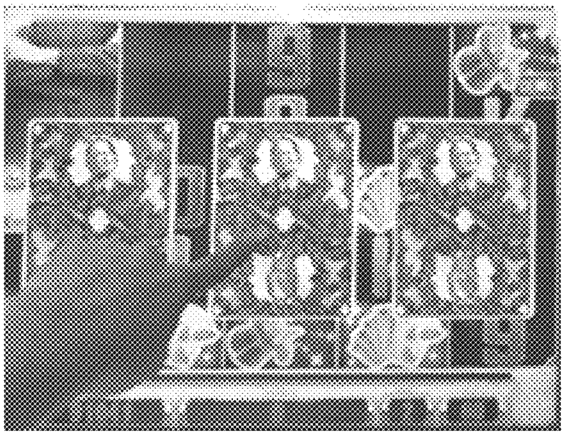
Figure 1G:
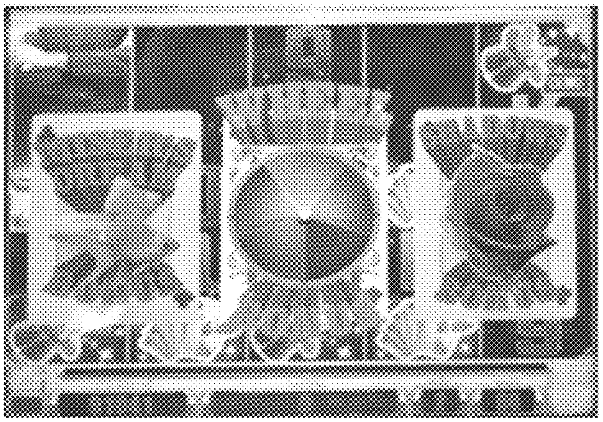
Figure 1H:
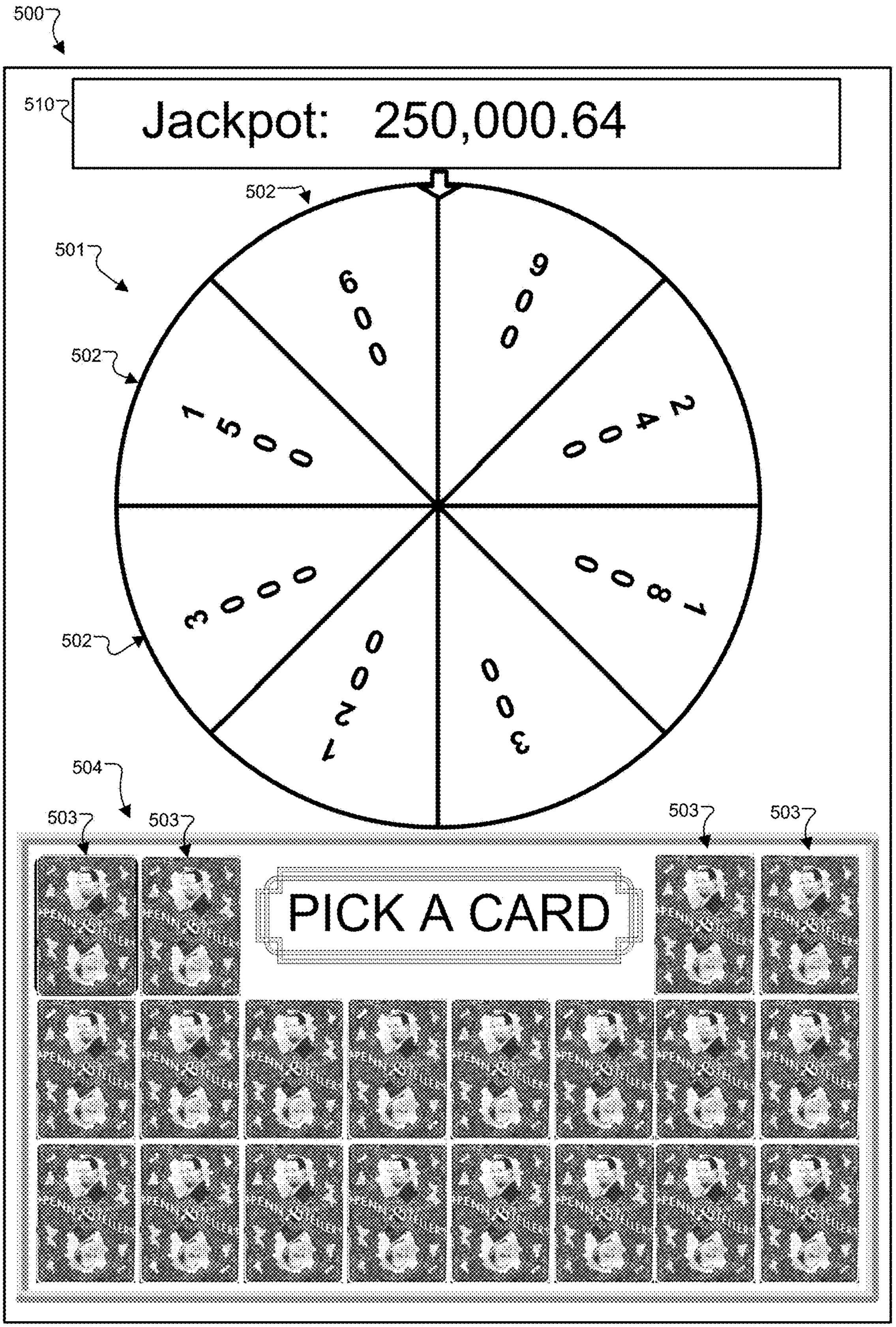
FIG. 1H is a screen diagram of a wheel enhance feature game according to an example embodiment.
Figure 1I:
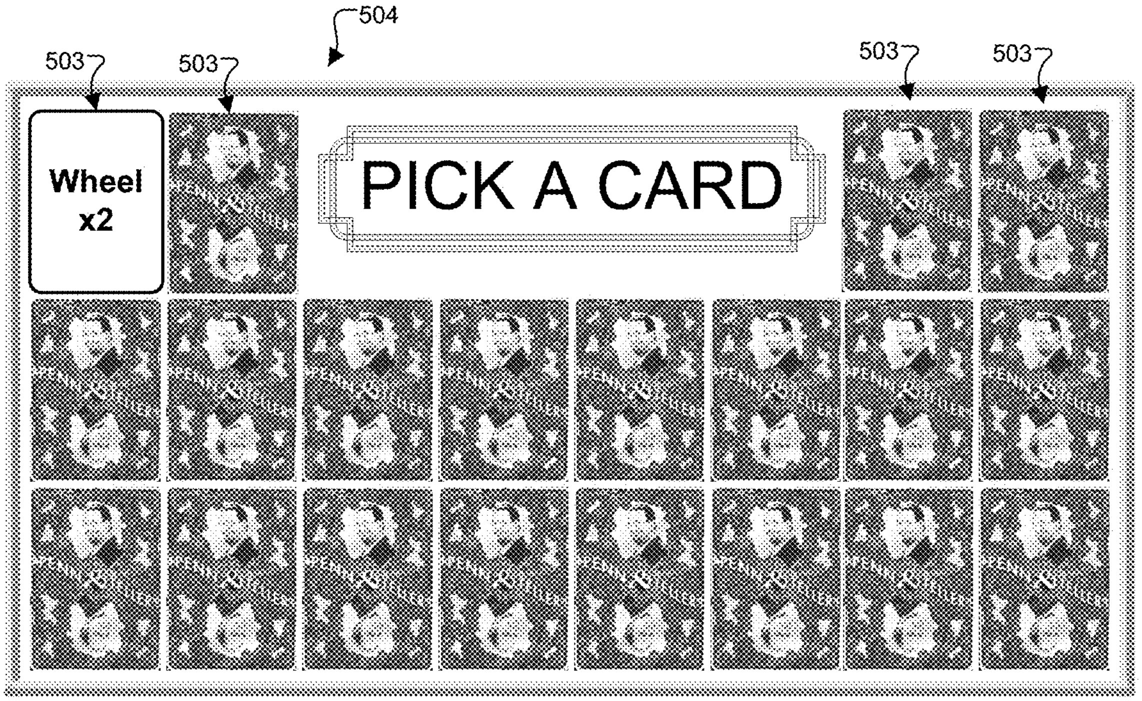
FIGS. 1I-K are additional screen diagrams of the player selection area from the game of FIG. 1H.
Figure 1J:
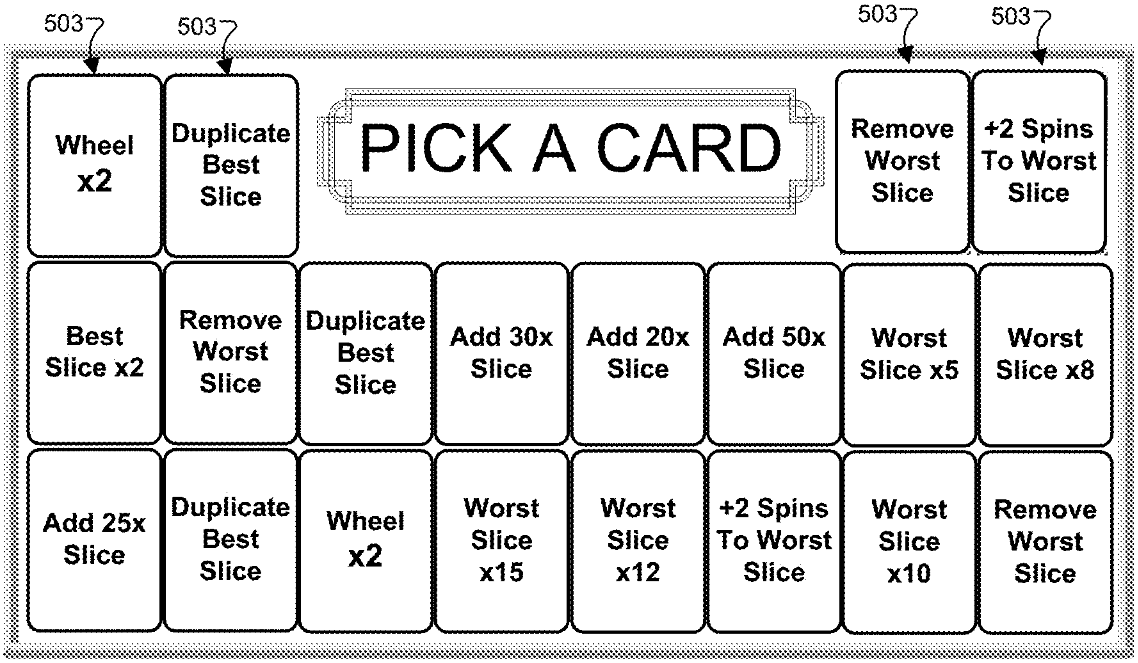

FIG. 1H is a screen diagram of a wheel enhance feature game according to the embodiment of FIGS. 1B-1G, which is the 'Wheel Bonus' game depicted as selected by the player. FIGS. 1I-J are additional screen diagrams of the player selection area from the game of FIG. 1H. These drawings and the depicted wheel enhance feature game will be further described below with respect to the flowchart of FIG. 2B.

Figure 2A:
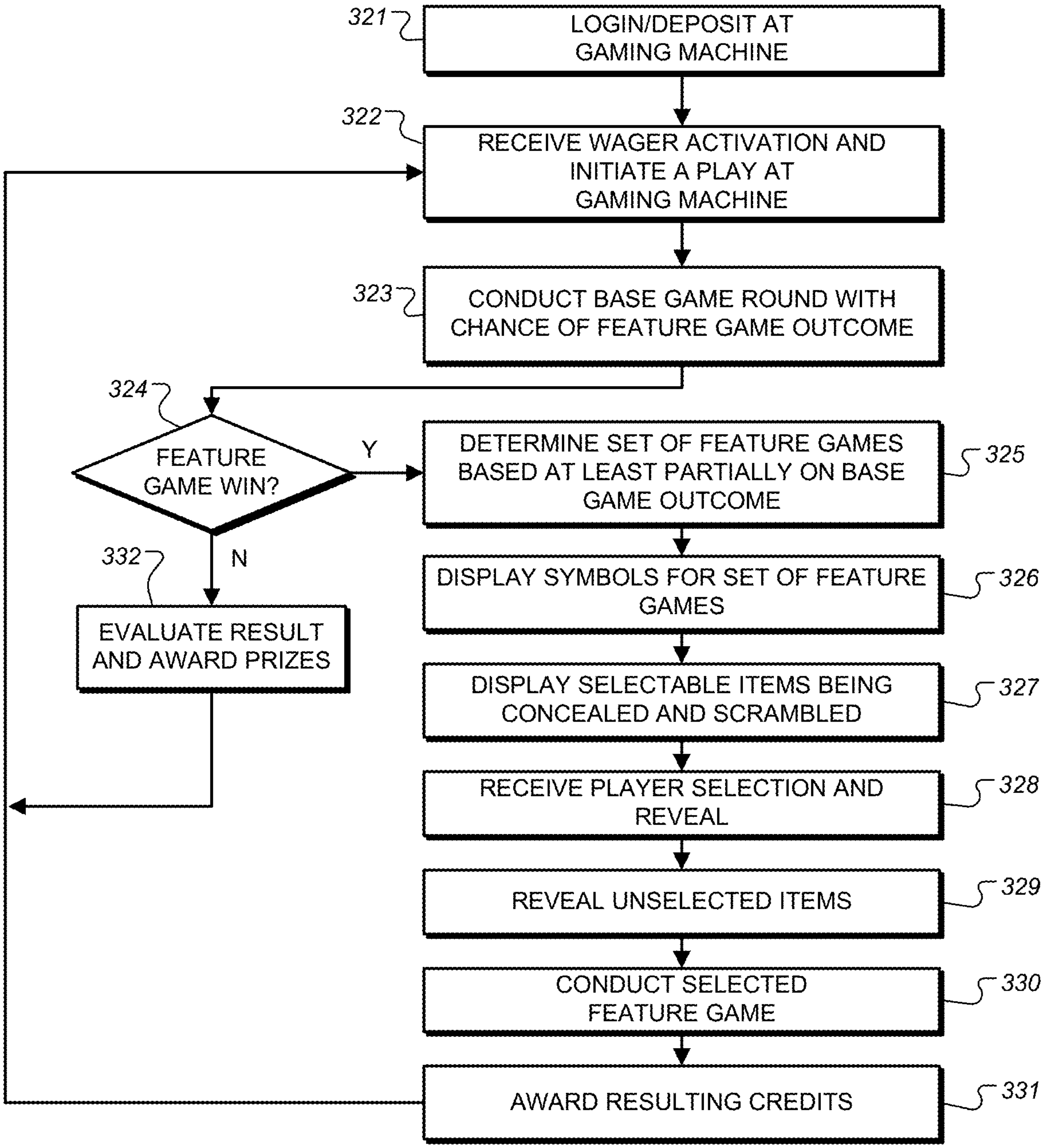
FIG. 2A is a flowchart showing a process for providing the feature game selection according to one or more embodiments of the invention.

FIG. 2A is a flowchart showing a process for providing the feature game selection according to one or more embodiments of the invention. Generally, the process is a method of providing a wagering game with selectable bonus features, the method conducted under control of one or more electronic processors to present gaming results on one or more displays on a gaming machine such as those described below. The process starts at block 321 where a player logs in or deposits money or a credit voucher at a gaming machine. To begin a game play, the method receives a wager activation on a player input device at the gaming machine at block 322, which typically consists of some input from the player to set the amount to be wagered from their credit amount on the machine. The wager amount may also be carried over from previous game rounds by simply starting the game with the previous wager amount set. This typically happens through a 'Play' button on the game cabinet or touchscreen display, and serves to place the wager and start a single round of game play in the base game at block 323. In embodiments having reels, reel displays, or simulated reels, this is conducted by spinning the reels. Other embodiments may otherwise rearrange or randomize the symbols on the matrix in any suitable manner. For games that use other methods of scrambling the matrix besides simulated reels, the random outcome is determined at this step as appropriate for the game. The preferred version generates at least one random number and uses the at least one random number to determine a set of game reel stops specifying a position in which multiple simulated or mechanical reels will stop to display symbols in a symbol array in a spin outcome for the wager. In any event, a base game round is conducted a base game round concluding with a base game result in which a matrix of symbol locations displayed on one of the gaming displays is populated with randomly selected symbols, the base game result including a possibility of winning money value credits and a possibility of winning a feature game outcome.

The feature game outcome may be activated in a variety of manners, but in the preferred version shown in FIGS. 1B-1G, the activation occurs when three designated bonus symbols appear together in the spin outcome. As seen in FIG. 1B, which shows a Penn & Teller™ card game theme, three card symbols are shown spun up on the center three reels of the matrix. Such an outcome is one example of the feature game activating outcome in FIG. 2A, block 324. Many other triggering or activation mechanism may be employed, such as a mystery trigger, a prize over a designated amount, or other known activation mechanisms. The activation mechanism used here is beneficial because it allows a relationship between the symbols and the bonus game to be played, as can be understood below. As shown, if a feature game activation occurs at block 324, the process goes to block 325 where it begins providing the feature game outcome. This includes, at block 325, determining a set of selectable feature games from a larger pool of feature games, the selection based at least partially on symbols present in the base game result matrix of symbol locations. In the example game herein, the symbols present in the base game result matrix determine which feature games will be available for selection, with each type of bonus symbol corresponding to a designated feature game and having theme graphics consistent with the game. This can be seen in FIG. 1C where, for example, the three cards appearing in the matrix have been enlarged and highlighted so the player can understand that the feature game selection is occurring. The fish card symbol relates to a 'Miser's Dream' bonus game, the roulette wheel or wheel theme symbol relates to the a 'Wheel Bonus' game, and the rose symbol relates to a 'Shadow Bonus' game (the game labels seen in FIG. 1G).

The determination of what feature games are available at block 325 of FIG. 2A is made from a larger pool of feature games, which may be associated with other symbols that are not present in this particular game result. The determination at block 325 may also be based partially on other factors such as, for example, the player bet level—with more desirable or more variety of bonus games available at higher bet levels. In the preferred version of FIGS. 1B-G, the presence of a predetermined number of designated symbols in the base game wins the feature game outcome, and each of the designated symbols is animated or graphically illustrated to visually or thematically correspond to a related feature game available in the feature game activating outcome.

Next at block 326, having determined what feature games will be available to possibly play, the process displays a set of feature game symbols or indicators to communicate to the player what games will be available to select from. This involves displaying an animation on at least one of the gaming displays with graphic indicators of the player selectable feature games. This can be seen, for example, in FIG. 1C, where the three enlarged cards are shown. At this stage the cards may be labelled with game titles or may be symbol indicators only, with more experienced players understanding more of what each displayed game entails. Such a feature provides more excitement to players when they achieve symbol for which they have never played the game, and desire to learn how the new game performs.

Next, at block 327, the process displays an animation in with the locations of selectable feature games during the player selection option are concealed from the player, and scrambled, shuffled, or otherwise randomized. This step may include a "three card monte" type display with a fast but visible movement of each item in which a skilled player could follow the item they wish to pick. Such a display may include a portion that is too fast to follow by the player, to allow for true randomization of the selection. An example of the concealed options are shown in FIG. 1D, where an animation of FIG. 1C shows the cards being flipped over. An example of the scrambling or randomization can be seen in progress in the view of FIG. 1E, where the cards are being moved in a three card monte fashion. Of course, this is not limiting and any other suitable concealment and randomization process may be employed.

Next at block 328, the process provides a player selection option in which the set of selectable feature games are available to be selected, and at block 328 receives the player selection and reveals it. An example of this can be seen in FIG. 1F, where a player is shown to select the middle card from the displayed group of three cards. The selected item revealed at block 328 can be seen, for example, in FIG. 2G, which shows the selected middle card with the wheel graphics, and includes the feature game title of 'Wheel Bonus'. The unselected items are also revealed at block 329, which may be done by flipping those cards over after a brief delay, to show the player where items they might have picked were located.

Next at block 330, the process conducts the selected feature game including a chance to win money value credits. Various known games or new games may be employed for the feature game provided at this step. At block 331 any credits won (typically feature games do not have zero credit outcomes), are awarded to the player, and the process returns the to the base game state to wait for the next player wager input. If no feature game win occurs back at block 324, the process evaluates the base game result following the standard base game rules at block 332, and also returns to receive the next wager at block 322.

Figure 2B:
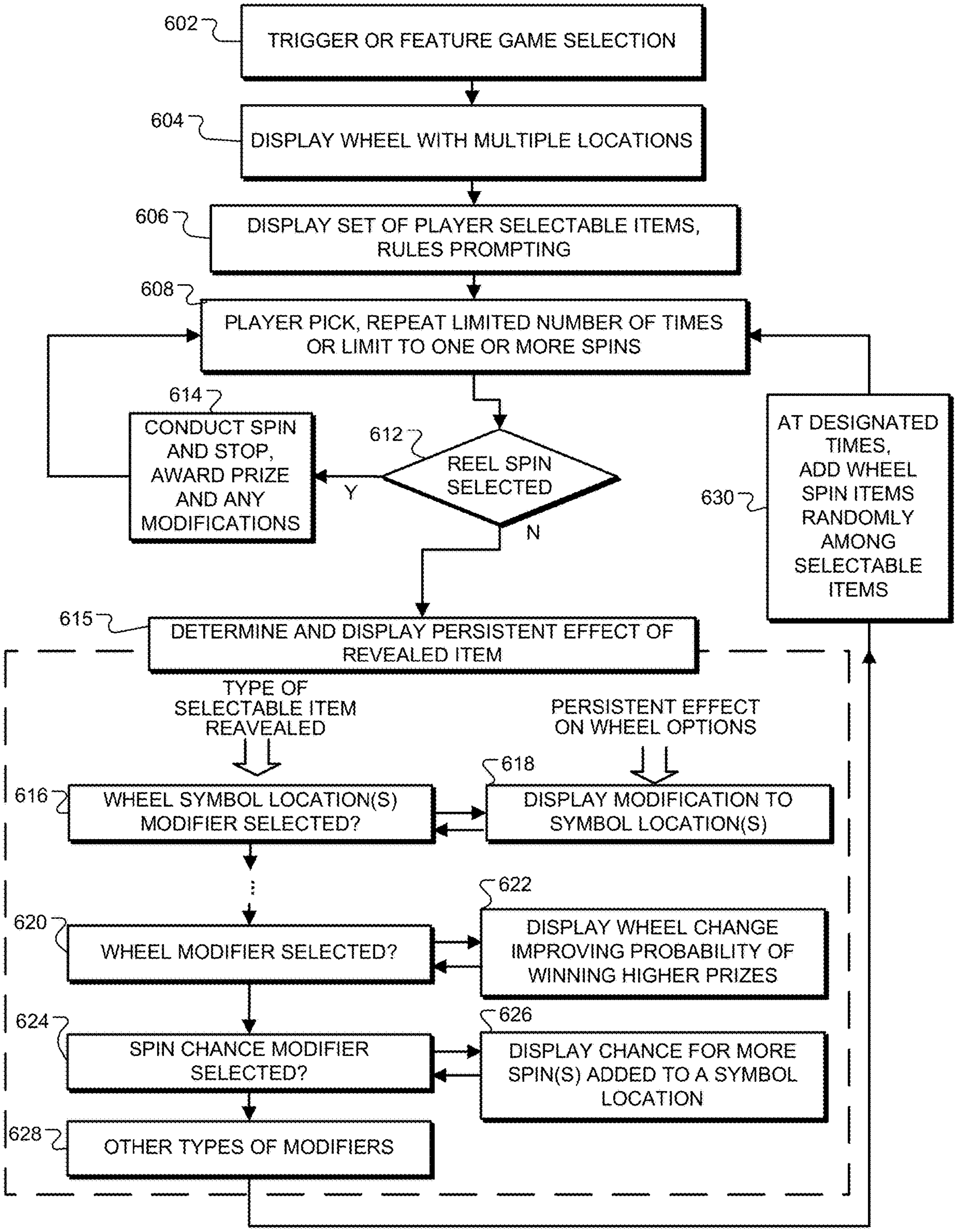
FIG. 2B is a flowchart showing a process for providing a wheel enhancement game according to one or more embodiments of the invention.

FIG. 2B is a flowchart showing a process for providing a wheel enhancement game according to one or more embodiments of the invention. The depicted process may be used with the version of the wheel enhancement game shown in FIGS. 1H-J, or other embodiments.

The process generally shows the control steps conducted by the programmed gaming machine, and may include steps conducted on a gaming server such as conducting the randomized parts of the game. Further, while example software flowhcharts are shown herein, this is not limiting and many other software designs can achieve the same effect. The depicted process begins at block 602 with a trigger event or a feature game selection such as that described above. The wheel enhancement game herein generally would not be provided as a base game, unless several wheel segments were made to provide no winning prizes, simply because the preferred design herein is a bonus game which generally provides a prize every time it is played. Of course, other versions may be provided as a base game employing some of the techniques herein.

Figure 1K:
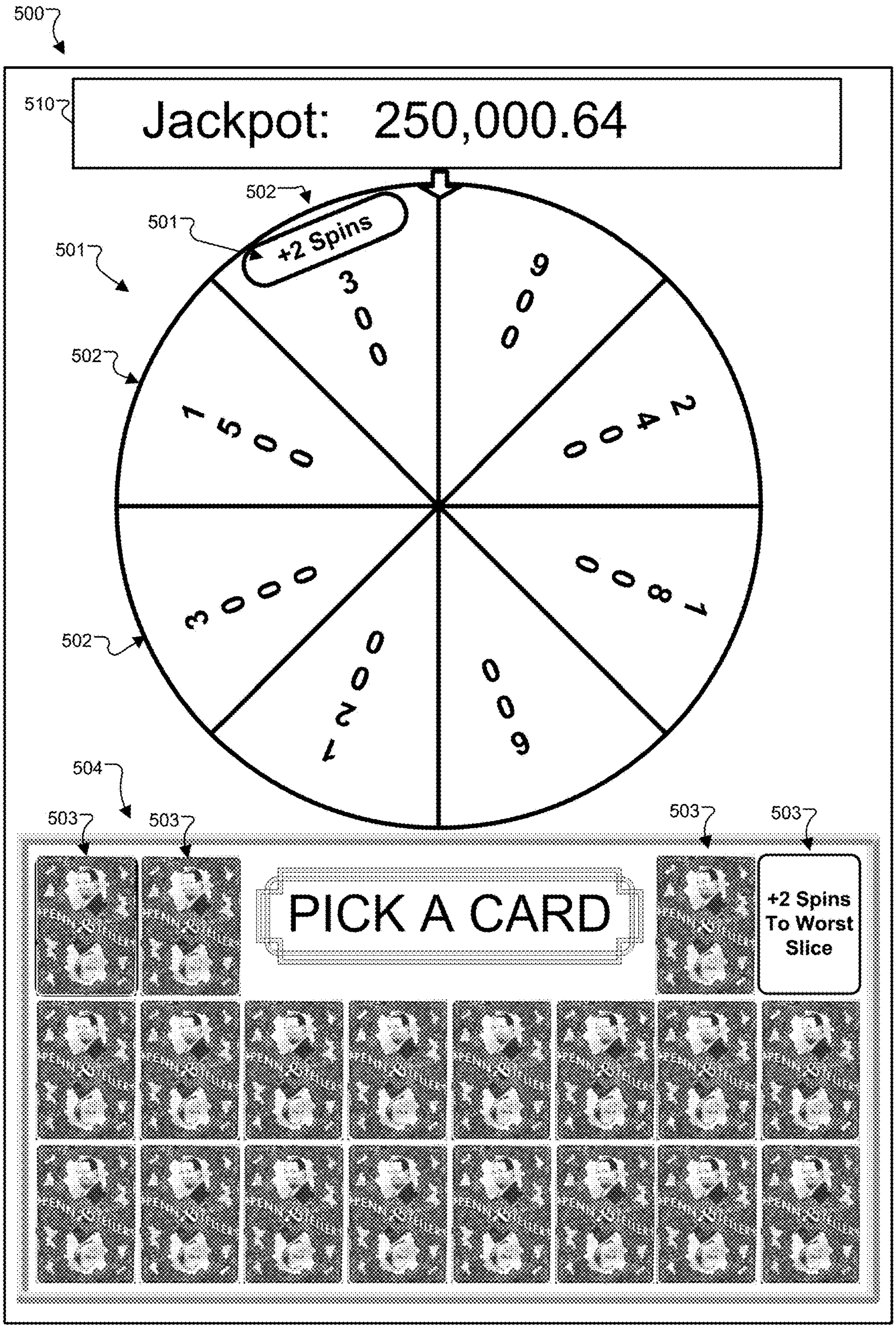

This version provides a bonus or feature game that is conducted in response to a trigger event or feature game election event and includes, at block 604, displaying a wheel having multiple symbol locations visible simultaneously and spaced apart at different angular orientations along its circumference. While an animated wheel on a gaming display such as primary display 104 or secondary display 107 (FIG. 3A) is preferred, some versions may also use a mechanical wheel provided it has some adjustability in order to make the persistent modifications described below. For example, a mechanical reel with LED arrays for lighting can be adjusted to provide games in some versions, or a mechanical reel with an LED display making up the wheel segments (slices) or symbol locations. Further, while the versions discussed herein place the symbol locations indicating the value or award associated with stopping at that location on the wheel, other versions may use a wheel that does not display the numbers or other symbols associated with the available prizes, and instead delineates the segments on a fixed ring surrounding a spinning wheel or pointer. They mathematical and anticipatory excitement effects in the game play are the same. Also, another various uses a round topper display on a traditional gaming cabinet such as cabinet 100 described below. Finally, while the version herein places the wheel at the player's gaming machine, other versions may have a group wheel above a bank of connected gaming machines, or a horizontal wheel surrounded by gaming machines. Player selections would, typically in these versions, still be made through the individual gaming machines. The example embodiment of the wheel displayed at block 604 is shown in the screen diagram of FIG. 1H, where wheel 501 is shown displayed above a player selection area 504, the wheel including symbol locations 502 which are typically implemented as segments or slices of the wheel, but may be arranged in other ways as long as the appropriate angular segment of the wheel circumference is associated somehow with the desired symbols so that a randomized outcome can be conducted with a spin or simulated spin of the wheel. In this version, symbol locations or "slices" 502 include symbols that are simply numbers showing the credit prize won by stopping at the respective location. Symbol locations 502 may have other types of symbols, such as the "+2 Spins" symbol described below, or other types of game symbols that correspond to credit or other awards that help a player advance in the game. A jackpot symbol may be included or added during the wheel enhancement game in some versions. A jackpot meter display 510 may be shown above the wheel for versions where a jackpot prize may be made available to be won on a wheel spin. FIG. 1I shows the player selection area 504 in an example game scenario where a player has made their first selection and chosen the top left item 503, which is revealed and is "played" or effects the game as further described below. FIG. 1J shows an example distribution of different types of player selectable items 503 having different effects. These will also be further discussed below with regard to the relevant software steps. FIG. 1K shows an example game screen in one scenario where a certain type of modifier item has been selected, as will be further described below.

Referring to FIG. 2B, the process at block 606 displays a group of hidden player selectable items, such as items 503 in FIG. 1H. A player is allowed to pick or select one of these items at block 608. The items, when selected, have varying effects to either spin or modify the wheel, depending on which type of item is selected. There are several types of available modifications, which are treated differently and have different, persistent effects on the game wheel 501. The goal of the game is to modify the wheel by selecting the best available modifications, and then spin it by selecting a spin, and win the best available prize. The game logic design is shown in this example as a flowchart for ease of understanding the design, but typically the software program code is written as 'event driven' objects in which each selectable item chosen by the player activates its own particular program code to implement its feature. As shown in the flowchart, when the player makes a pick or selection at block 608 to reveal their selected item, if a wheel spin event is selected as found at decision block 612, the process then goes to block 614 where it conducts a spin of the wheel 501, causing the wheel to rotate for a period of time and stop at a particular angular orientation which is evaluated for a winning outcome based on the location of the wheel's symbols (typically the symbol selected is that aligned with the arrow at the top of the wheel, but this is not limiting). Whatever award or wheel enhancement prize is shown at location where the wheel stops, the process awards a resulting prize to the player.

While this example process checks for a wheel spin selection first, some versions may not provide a wheel spin selection among the group of player selectable items 503 during the first few selections, in order to avoid the player spinning the wheel too early before enough excitement is built up over the enhancements made to the wheel by the repeated selections at block 608. This is shown at block 630, where after player selections are processed at designated times such as after the first three selections or after every three selections, one or more spin evens are randomly placed into the player selectable items. In the preferred version of FIG. 1H, this is done by animating the selections 503, which resemble playing cards, to have a number of 'wheel spin' cards added and then all the cards as a deck are shown to be shuffled and redistributed out in player selection area 504. In some version, the process may further include causing a player selectable item having the wheel spin effect to be activated after a designated predetermined number of selections in the feature game. This may occur in place of a player selected item at the designated number of selections, or in addition to the item. Further, the effects available to be selected in the feature game include providing a selectable item that allows the player to select at least two additional items. The effects available may also include increasing the number of selections made by the player in the round, regardless of whether a spin occurs on a particular selection. Generally, the spin of the wheel is controlled by a random number generator, but some versions may provide a true mechanical spinning wheel, or a mechanical wheel controlled by a random number generator. The generation and distribution of selectable items may also be controlled by a random number generator.

Referring again to the flowchart process of handing each player selectable item that is selected, if there is no wheel spin at block 612, the process goes to block 615 where it determines which type of effect or modification results from the selected item. A dotted line is drawn to show the several different options that occur within this general phase of process for block 615. As discussed above, the various options may not actually be checked in order but may be accomplished by event driven programming. The type of object selected is shown to the left with sub-blocks 616, 620, 624, and 628, while the associated effect on the game is shown on the right at blocks 618, 622, and 626. At the first sub-block 616, the selected item 503 may be a wheel symbol location modifier. That is, it may have the effect of making persistent modifications to one or more of the wheel symbol locations 502, in which case the process at block 618 displays an animation of these modifications being conducted on the wheel 501, to each effected symbol location. This block also causes the variables associated with calculating any potential prizes to be updated to the new, typically higher, values associated with the change at block 618. By persistent it is meant that the displayed modifications or effects last beyond the present 'round' or selection of the game, at least through one more selection but typically until the game ends or the effects are overruled by other persistent effects made in later rounds. Several example of these symbol location modifiers are shown in the game screen diagrams of FIG. 1J. These are:

The Wheel ×2 modifier, which multiplies every prize shown in every symbol location on the wheel times 2.

The Best Slice ×2 modifier, which multiplies the highest value slice on the wheel times 2.

The Worst Slice ×5 modifier, which multiplies the lowest value slice on the wheel times 5.

The Worst Slice ×8, ×12, ×15, ×10 modifiers, which act similarly to the Worst Slice ×5.

Many other symbol location modifiers are possible that act on one, some, or all of the symbol locations on the wheel. This second type of selectable item, after the first wheel spin item, generally modifies one or more of the wheel's multiple symbol locations in a persistent manner to improve the player's options available for winning Other versions may include a symbol modifier that diminishes the players options available for winning, however such a modifier is not employed in preferred versions. The symbol location modifier may add progressive prizes to the wheel based on networked or local (machine bank or single machine) progressive pools.

Next, at block 620, the selected item may be wheel modifier type, which modifies the wheel and not just a symbol location. If so, the process at block 622 achieves the modification by displaying the wheel being modified to improve the player's probability of winning a high value prize. The appropriate game math variables are also adjusted at this step to reflect the modified state of the game. A high value prize are typically those in the top half of available prizes. Depending on the game math there may be many lower value prizes and only a few higher value prizes, but generally a wheel modification that improves the player's probability of winning a high value prize improves the average expected outcome of a given wheel spin. But generally the wheel modifier items should be designed to make the modification, and communicate it clearly to the player, that a prize much larger than the lowest prize is being made available or more likely to be won by this modification. Some example of these wheel modifiers are shown in the game screen diagrams of FIG. 1J:

The Duplicate Best Slice modifier, which adds a slice to the wheel equal to the highest value or best slice present, leaving the wheel with one more slice or symbol location than it had before the modification. This is preferably done with an animation emphasizing the highest value slice and showing it copying or dividing and a visually identical slice appearing.

The Remove Worst Slice modifier, which causes the lowest value or worst slice on the wheel to be removed, again preferably with an animation for emphasis, leaving the wheel with one less slice than before and a higher average value for a spin of the modified wheel.

The Add 30× Slice, which adds a slice or symbol location to the wheel with a displayed value of 30× the players wager in credits.

The Add 20× Slice, Add 25× Slice and Add 50× Slice modifiers, which work similarly.

(Not shown) an Add Jackpot Slice modifier may be included to add a slice to the wheel enabling a jackpot win, for systems that support jackpots.

Other types of wheel modifiers may be employed, however the preferred version uses wheel modifiers that improve the chances of winning a high value prize as discussed above. More generally one of the wheel modifiers may be applied to add a symbol location and an associated winning option to the wheel. The wheel modifier may be used to add a progressive prize to the wheel, a jackpot, or a progressive jackpot, as coordinated by a progressive server described below. Another wheel modifier may be applied to remove a symbol location and an associated winning option from the wheel. Some versions may use a wheel modifier that reduces the chances of winning a high value prize, however this is not preferred. Further, in some embodiments, wheel modifiers may be added to the game round as the player makes more selections, at block 630. This may be done after a designated number of selections have been made in the game, especially in the case of the Add Jackpot Slice wheel modifier.

Next at block 624, the selected item could be another type of item, a spin chance modifier, which alters the chances of getting a wheel spin or the number of wheel spins that could be achieved in the wheel enhancement game at block 626. The preferred version modifies the number of chances available in the feature game to win a spin the wheel. An example of this type of player selectable item is shown in the example game screen of FIG. 1K, where a player selectable item 503 is shown to have been selected in the upper right of area 504, a '+2 Spins to Worst Slice' item, and the persistent effect shown added to the wheel as a result is the +2 Spins indicator 508 added to the lowest value, 300 credit, slice or symbol location. This indicator stays on the slice for the duration of the game and, if the wheel stops on that slice during a spin, two additional spins are made available in the game. Preferably these are taken immediately. Of course other numbers of spins may be added, or more wheel spin items 503 may be added to area 504 by other spin chance modifiers.

As is shown on the flowchart, other types of modifiers or enhancements may be made provided in other versions to be selected by the player, as shown at block 628. For example, a player selectable item might reshuffle the items in area 504, rearrange the wheel, or other persistent modification to the wheel or selectable items. A modification from a player selectable item may be applied to increase the number of player selectable items available for the player to select. Some selectable items may be provided which, when selected, allow the player to pick immediately pick more selectable to modify the wheel.

After block 628, the process goes to block 630 where, as described above, it may add Wheel Spin selectable items among items 503 in area 504. Then the process then returns to allow the player to pick another item at block 608, and generally the process provides the player a number of selections from the hidden selectable items, and providing the designated effect of each selected item by cycling back through the loop and making the modification to the wheel resulting from each selection. These modifications enhance the wheel and make it more desirable to have a wheel spin. As discussed, the preferred game ends after one spin, but the number of spins may be altered during the game. Other versions may set a different number of spins to end the game and may choose to not alter that number. After each spin, the process causes the award including money value credits won to be transferred to a player credit account redeemable for money value.

Player engagement is heightened by the animations of the wheel being enhanced. For example, preferably those wheel modifiers items discussed at block 620 are implemented by displaying an animated sequence showing the new symbol location appearing on the wheel and shrinking other symbol locations to make room for the new location. Generally some version provide that at least one modification from a player selectable item is applied to the wheel for the duration of a bonus round including multiple activations of the wheel and multiple chances for the player to modify the wheel's symbol locations with player selectable items. Other versions provide that at least one modification from a player selectable item is applied to the wheel for multiple activations of the wheel during a bonus round, and then modified by a subsequent player selectable item being selected.

Further, the system computer program code, executable by a gaming machine or gaming network processor, as described herein are preferably executed by a Class III gaming machine which conducts all random number generation on the gaming machine itself as further discussed below. It should be understood that this is only one example embodiment, and other versions may divide the processing tasks of the game method in a different manner. For example, some systems may employ a thin client architecture in which practically all of the processing tasks are performed at the game server, and only display information for the player interface transmitted to the electronic gaming machine. In such an embodiment, only the steps involving player input or display are performed by the electronic gaming machine, with the remaining steps performed by one of the game servers in the system. In such a case, though, the software architecture is preferably designed as a thin client in which a dedicated virtual machine running on the game server (or a virtual machine server connected in the gaming network) performs the tasks designated in the present drawing as occurring "at the gaming machine." In the depicted flowcharts, the method is performed by the respective computer hardware operating under control of computer program code. While central processor arrangements may vary (for example award controllers may be integrated on the same machine with a gaming server, or may be a separate server connected on a secure network), the particular central determinant architecture is not limiting and will be referred to generally in this drawing as the game server (i.e. 302, 403). As shown at block 323 in FIG. 2A, the method performed at the game server further includes receiving game play requests originating from electronic gaming machine 100, and sending commands to the gaming machine to show reels spinning, the feature game selection process, the wheel enhancement feature game, and results being displayed. The division of game logic steps between gaming machines and servers is known in the art and may be accomplished according to suitable methods allowed for the relevant gaming jurisdictions.

Figure 3A:
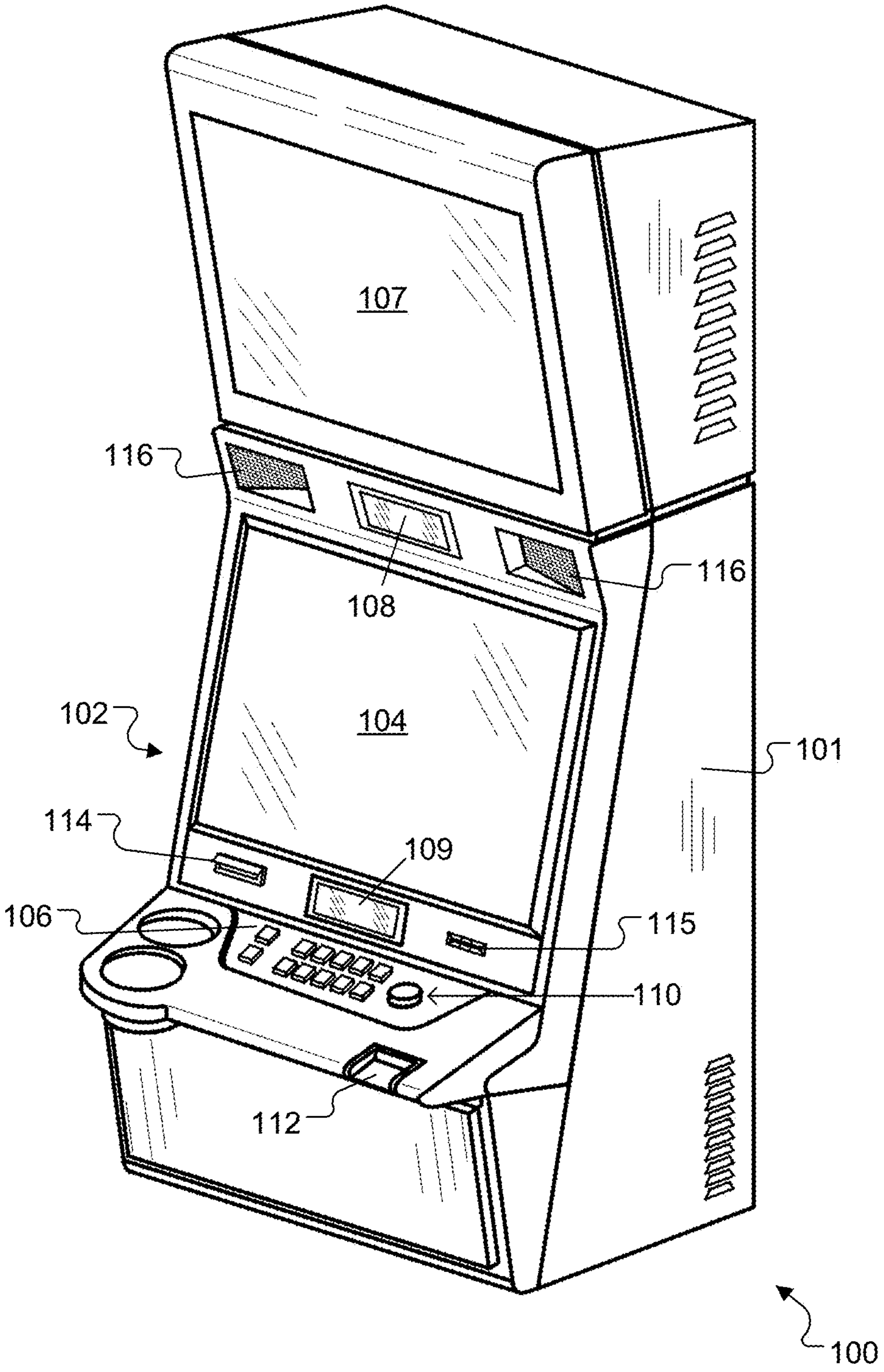
FIG. 3A is a front perspective view of a gaming machine which may be used in a gaming system embodying the principles of the present invention.
Figure 3B:
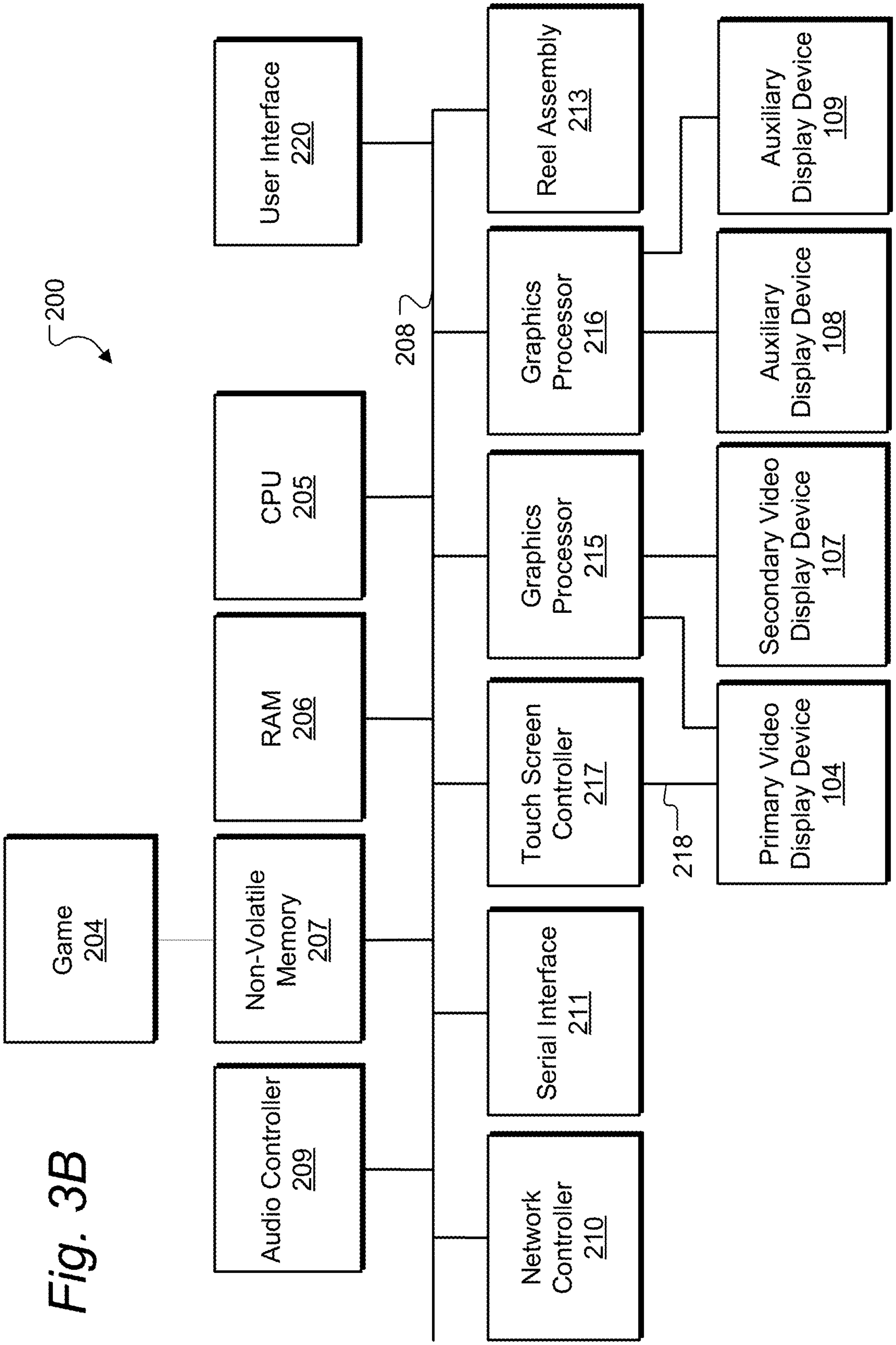
FIG. 3B is a block diagram showing various electronic components of the gaming machine shown in FIG. 3A together with additional gaming system components.

FIG. 3A shows a gaming machine 100 that may be used to implement feature games according to the present invention. The block diagram of FIG. 3B shows further details of gaming machine 100. Referring to FIG. 3A, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3A also includes a number of mechanical control buttons 110 mounted on ledge 106. These control buttons 110 may allow a player to select a bet level, select paylines, select a type of game or game feature, and actually start a play in a primary game. Further, primary video display device 104 in gaming machine 100 provides a convenient display device for implementing touchscreen controls.

It will be appreciated that gaming machines may also include a number of other player interface devices in addition to devices that are considered player controls for use in playing a particular game. The ledge may also include a hardware special object including a button, touch sensor, or switches, joysticks, or other mechanical input devices, and/or virtual buttons and other controls implemented on a suitable touchscreen video display. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 3B shows a logical and hardware block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 3A). A second graphics processor 216 is also connected on bus 208 in this example to drive the auxiliary display devices 108 and 109 also shown in FIG. 3A. As shown in FIG. 3B, gaming machine 100 also includes a touch screen controller 217 connected to system bus 208. Touch screen controller 217 is also connected via signal path 218 to receive signals from a touchscreen element associated with primary video display device 104. It will be appreciated that the touchscreen element itself typically comprises a thin film that is secured over the display surface of primary video display device 104. The touchscreen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3B are elements commonly associated with a personal computer system architecture. These elements are preferably mounted on a standard personal computer chassis and housed in a standard personal computer housing which is itself mounted in cabinet 101 shown in FIG. 3A. Alternatively, the various electronic components may be mounted on one or more circuit boards housed within cabinet 101 without a separate enclosure such as those found in personal computers. Those familiar with data processing systems and the various data processing elements shown in FIG. 3B will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 3B as being connected directly on system bus 208 may in fact communicate with the other system components through a suitable expansion bus. Audio controller 209, for example, may be connected to the system via a PCI bus. System bus 208 is shown in FIG. 3B merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. In some embodiments, the persistent event meter 1506 may be displayed on secondary video display 107 rather than beside the matrix of symbol locations or other type of primary gaming zone on the primary display. The invention is not limited to any particular arrangement of processing devices for controlling the video display device included with gaming machine 100. Also, a gaming machine implementing the present invention is not limited to any particular number of video display devices or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine, and may also implement a game client for directing one or more display devices at the gaming machine to display the feature game mode according to the present invention. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs, while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the persistent game mode as will be discussed below in connection with FIG. 4A.

It should be noted that the invention is not limited to gaming machines employing the personal computer-type arrangement of processing devices and interfaces shown in example gaming machine 100. Other gaming machines through which the features herein are implemented may include one or more special purpose processing devices to perform the various processing steps for implementing the present invention, such as generating random numbers or checking the security status of software packages or gaming credit vouchers. Unlike general purpose processing devices such as CPU 205, these special purpose processing devices may not employ operational program code to direct the various processing steps.

It should also be noted that the invention is not limited to gaming machines including only video display devices for conveying results. It is possible to implement a feature game within the scope of the present invention using an electro mechanical arrangement or even a purely mechanical arrangement for displaying the symbols or first and second animations or reactions needed to complete the wheel enhancement game as described herein. For example, a gaming machine suitable for providing a wheel enhancement game may include a mechanical wheel display rather than a video-type display device for displaying results in a wheel enhancement game, and include a video display device for presenting the base game separately.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and reel assembly 213 (if mechanical reel configuration). CPU or game processor 205 may comprise a conventional microprocessor, such as an Intel Pentium microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information, and game processor 205 may respond according to its programming, such as to apply a wager and initiate execution of a game.

Figure 4A:
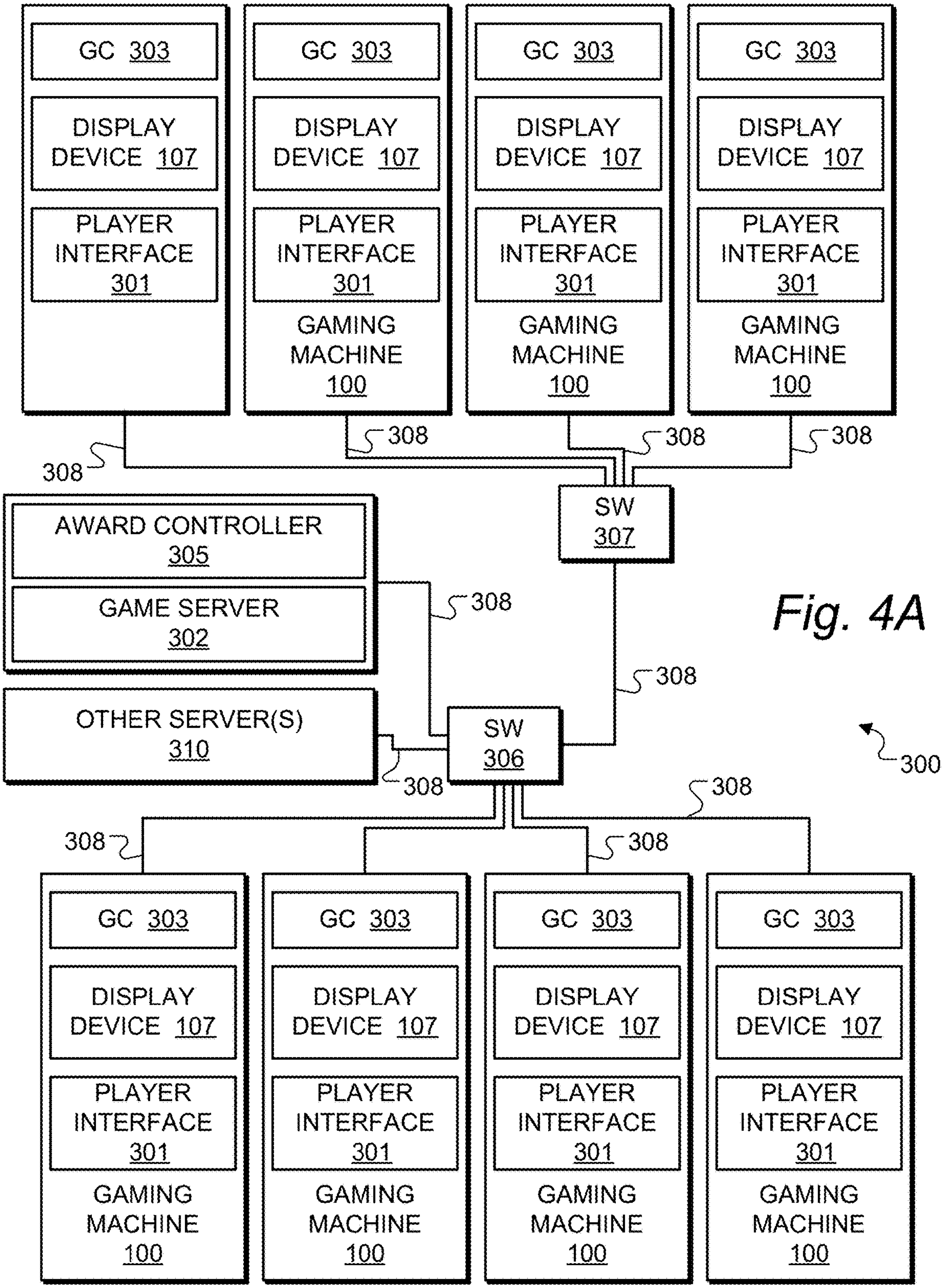
FIG. 4A is a system block diagram of a gaming system according to one embodiment of the present invention.
Figure 4B:
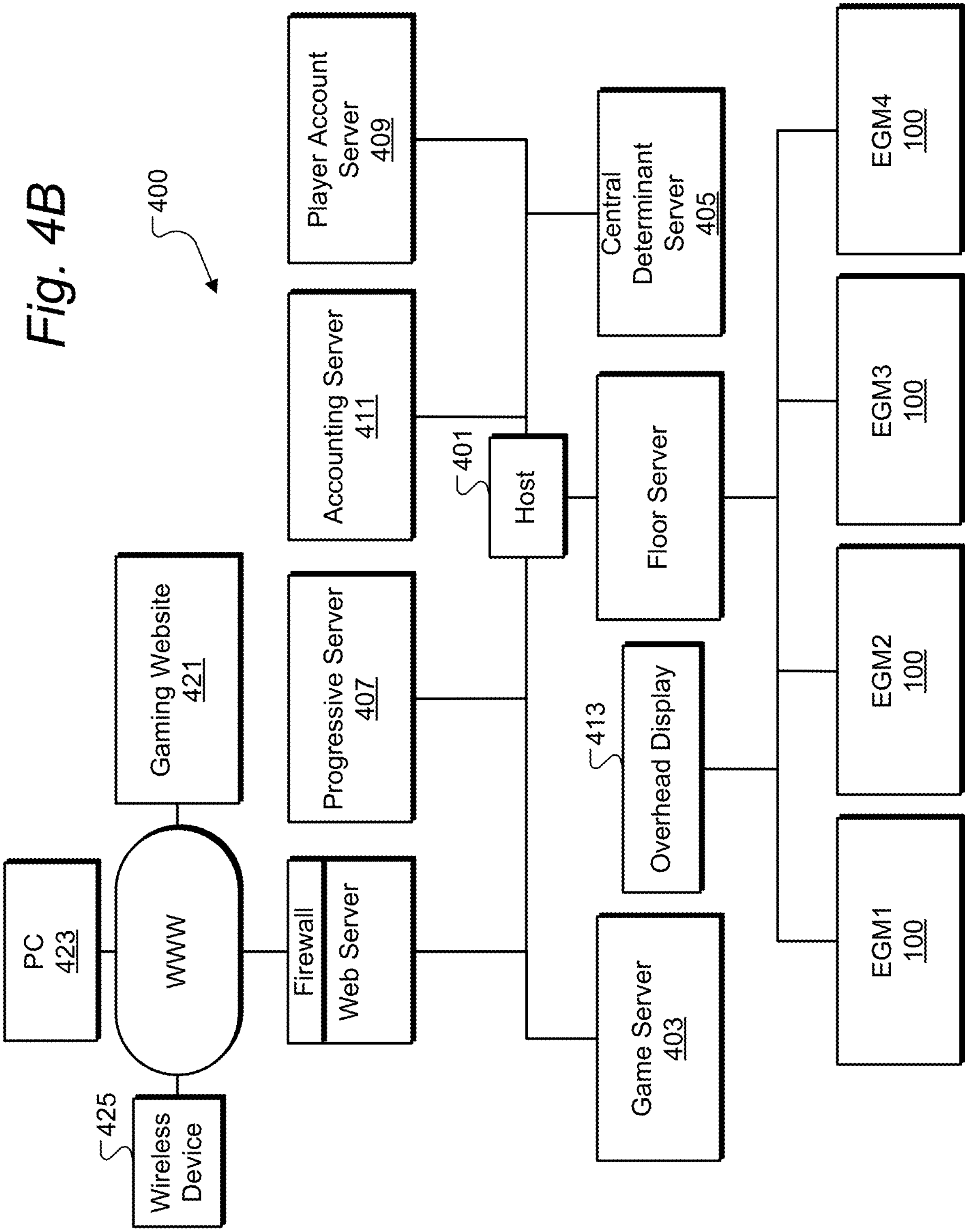
FIG. 4B is a system block diagram of a gaming system according to another embodiment of the invention.

Game processor 205 also may connect through network controller 210 to a gaming network, such as example casino server network 400 shown in FIG. 4B. Referring now to FIG. 4B, the casino server network 400 may be implemented over one or more site locations and include host server 401, remote game play server 403 (which may be configured to provide game processor functionality including determining game outcomes and providing audio/visual instructions to a remote gaming device), central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Referring now to FIG. 4A, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 4A is shown as including a video display device 107 and a player interface 301 that may include buttons, switches, or other physical controls and/or touchscreen controls as discussed above in connection with FIG. 4A. System 300 further includes a game server 302 and a respective game client 303 (abbreviated "GC" in FIG. 4A) included with each respective gaming machine 100. In the form of the invention shown in FIG. 4A, these two components, game server 302 and the game client components 303, combine to implement a game control arrangement which will be described in detail below. System 300 also includes an award controller 305, which is shown in FIG. 4A as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 4A.

Each gaming machine 100, and particularly player interface 301 associated with each gaming machine, allows a player to make any inputs that may be required to make the respective gaming machine eligible for a persistent game mode, and make other inputs that may be required to conduct the game. Player interface 301 also allows a player at the gaming machine to initiate plays in a primary game available through the gaming machine. The respective video display device 107 associated with each respective gaming machine 100 is used according to the invention to generate the graphic displays to show the various graphic elements described herein.

The game control arrangement made up of game server 302 and the respective game client 303 at a given gaming machine functions to control the respective video display device 107 for that gaming machine to display the base and bonus games herein. Award controller 305 is responsible for awarding prizes for a player's participation in a wheel enhancement feature game, and maintaining progressive prize information where the wheel enhancement game offers one or more progressive prizes. The network arrangement made up of network switches 306 and 307, and the various communication links 308 shown in FIG. 4A is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 4A shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) different from the game described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 4A are shown only to indicate that numerous other components may be included along with the elements that participate in providing persistent game modes according to the present invention. Other server(s) 310 may provide record keeping, player tracking, accounting, result identifying services, or any other services that may be useful or necessary in a gaming system.

Referring to FIG. 4B, a block diagram of another example networked gaming system 400 associated with one or more gaming facilities is shown, including one or more networked gaming machines 100 in accordance with one or more embodiments. With reference to FIG. 4B, while a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective player's video images may be displayed on overhead display 413 along with the content of the player's gaming machine 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Progressive prizes may be made available to be won through display on the when enhancement feature game wheel's symbol locations 502, and may be added to the wheel by either a symbol location modifier or a wheel modifier type player selectable event 503 in the course of the wheel enhancement feature game. Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Apple iPhone, Android phone, tablet, phablet, virtual reality device, iPad, etc.). To enter the website, a player may log in with a username (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method of providing a wagering game with selectable bonus features, the method conducted under control of one or more electronic processors to present gaming results on one or more displays on a gaming machine, the method comprising:

(a) receiving a wager activation on a player input device at the gaming machine;

(b) in response, conducting a base game round concluding with a base game result in which a matrix of symbol locations displayed on one of the displays is populated with randomly selected symbols, the base game result including a possibility of winning money value credits and a possibility of winning a feature game outcome, wherein presence of a predetermined number of designated symbols in the base game result wins the feature game outcome;

(c) providing a feature game outcome by:

i) determining a set of selectable feature games from a larger pool of feature games, the determination based at least partially on symbols present in the base game result matrix of symbol locations, and wherein each of the predetermined number of designated symbols is graphically illustrated to thematically correspond to a different respective related feature game available in the feature game outcome;

ii) after determining the set of selectable feature games, displaying an animation on at least one of the displays with graphic indicators of the selectable feature games;

iii) after ii) providing a player selection option in which the set of selectable feature games are available to be selected;

iv) receiving a player selection at the player selection option and based on the player selection, displaying an indication of the selected feature game and indications of locations of non-selected feature games in the player selection option;

v) conducting the selected feature game including a chance to win money value credits; and (d) causing an award including money value credits won to be transferred to a player credit account redeemable for money value.

2. The method of claim 1, in which locations of selectable feature games during the player selection option are concealed from a player.

3. The method of claim 1, further comprising animating the base game result to display each of the predetermined number of symbols moving from the respective symbol location and coming to rest to display an indication of the related feature game associated with each of the predetermined number of symbols.

4. A gaming system including:

a display system including one or more gaming displays;

a player input system;

at least one processor operably connected to the display system and player input system; and at least one memory device operably connected to the processor and storing program code executable by the at least one processor for:

(a) receiving a wager activation on the player input system;

(b) in response, conducting a base game round concluding with a base game result in which a matrix of symbol locations displayed on one of the gaming displays is populated with randomly selected symbols, the base game result including a possibility of winning money value credits and a possibility of winning a feature game outcome, wherein the presence of a predetermined number of designated symbols in the base game result wins the feature game outcome;

(c) providing a feature game outcome by:

i) determining a set of selectable feature games from a larger pool of feature games, the selection based at least partially on symbols present in the base game result matrix of symbol locations, and wherein each of the predetermined number of designated symbols is graphically illustrated to thematically correspond to a different respective related feature game available in the feature game outcome;

ii) after determining the set of selectable feature games, displaying an animation on at least one of the gaming displays identifying to the player the selectable feature games;

iii) after ii) providing a player selection option in which the set of selectable feature games are available to be selected;

iv) receiving a player selection at the player selection option and based on the player selection, displaying an indication of the selected feature game and indications of locations of non-selected feature games in the player selection option;

v) conducting the selected feature game including a chance to win money value credits; and (d) causing an award including money value credits won to be transferred to a player credit account redeemable for money value.

5. The system of claim 4, in which locations of selectable feature games during the player selection option are concealed from a player.

6. The system of claim 4, in which the program code is further executable by the at least one processor for animating the base game result to display each of the predetermined number of symbols moving from the respective symbol location and coming to rest to display an indication of the related feature game associated with each of the predetermined number of symbols.

* * * * *